US009867125B2

(12) United States Patent
Eremenko et al.

(10) Patent No.: US 9,867,125 B2
(45) Date of Patent: Jan. 9, 2018

(54) SYSTEMS FOR ENABLING MODULAR MOBILE ELECTRONIC DEVICES

(71) Applicant: Google Inc., Mountain View, CA (US)

(72) Inventors: Paul Eremenko, Mountain View, CA (US); David Fishman, Mountain View, CA (US); Seth Newburg, Mountain View, CA (US); Ara Knaian, Mountain View, CA (US); Marisa Bober, Mountain View, CA (US)

(73) Assignee: Google LLC, Mountain View, CA (US)

( * ) Notice: Subject to any disclaimer, the term of this patent is extended or adjusted under 35 U.S.C. 154(b) by 57 days.

(21) Appl. No.: 14/462,878

(22) Filed: Aug. 19, 2014

(65) Prior Publication Data

US 2015/0289273 A1    Oct. 8, 2015

Related U.S. Application Data

(60) Provisional application No. 61/976,173, filed on Apr. 7, 2014.

(51) Int. Cl.
*G04B 47/00* (2006.01)
*H04W 52/02* (2009.01)
*H02J 5/00* (2016.01)
*H04B 5/00* (2006.01)
*H04W 72/04* (2009.01)
*H02J 1/06* (2006.01)
*H04L 12/933* (2013.01)

(52) U.S. Cl.
CPC .......... *H04W 52/0203* (2013.01); *H02J 1/06* (2013.01); *H02J 5/005* (2013.01); *H04B 5/0037* (2013.01); *H04W 72/0453* (2013.01); *H04L 49/15* (2013.01); *Y02B 60/50* (2013.01)

(58) Field of Classification Search
CPC . H04W 52/0203; H04W 72/0453; H02J 1/06; H02J 5/005; H04B 5/0037; Y02B 60/50; H04L 49/15
See application file for complete search history.

(56) References Cited

U.S. PATENT DOCUMENTS

| 4,658,333 | A | 4/1987 | Grimes |
| 4,856,088 | A | 8/1989 | Oliwa et al. |
| 4,904,549 | A | 2/1990 | Goodwin et al. |
| 4,974,317 | A | 12/1990 | Noe et al. |
| 5,508,720 | A | 4/1996 | DiSanto et al. |
| 5,598,487 | A | 1/1997 | Hacket et al. |
| 5,895,230 | A | 4/1999 | Bartley |
| 5,918,189 | A | 6/1999 | Kivela |

(Continued)

FOREIGN PATENT DOCUMENTS

WO    2013120723 A1    8/2013

*Primary Examiner* — Phuc Tran
(74) *Attorney, Agent, or Firm* — Dority & Manning, P.A.

(57) ABSTRACT

A system for enabling a modular mobile electronic device including a module communication network enabling data transfer between modules of the modular mobile electronic device, a module power network enabling power transfer between modules of the modular mobile electronic device, a set of module interfaces removably and mechanically coupling modules of the modular mobile electronic device to the modular mobile electronic device, and a supervisory controller communicatively coupled to the module communication network and electrically coupled to the module power network.

2 Claims, 8 Drawing Sheets

(56) References Cited

U.S. PATENT DOCUMENTS

| | | | |
|---|---|---|---|
| 5,983,303 A | 11/1999 | Sheafor et al. | |
| 6,219,732 B1 | 4/2001 | Henrie et al. | |
| 6,619,835 B2* | 9/2003 | Kita | A44C 5/0015 368/10 |
| 6,640,113 B1 | 10/2003 | Shim et al. | |
| 6,697,251 B1 | 2/2004 | Aisenberg | |
| 6,862,173 B1 | 3/2005 | Konshak et al. | |
| 6,919,709 B2* | 7/2005 | Rouverand | H02J 7/0029 320/128 |
| 7,068,499 B2 | 6/2006 | Aisenberg | |
| 7,075,280 B2* | 7/2006 | May | H02M 3/1588 323/224 |
| 7,206,567 B2* | 4/2007 | Jin | H04M 1/677 455/404.1 |
| 7,436,655 B2 | 10/2008 | Homer et al. | |
| 7,458,815 B2 | 12/2008 | Fallah-Adl et al. | |
| 7,509,094 B2 | 3/2009 | Moran et al. | |
| 7,618,260 B2* | 11/2009 | Daniel | A44C 5/0007 24/311 |
| 7,633,389 B2* | 12/2009 | Mantovani | G08B 21/0202 340/539.13 |
| 7,760,522 B2* | 7/2010 | Nobiki | H02M 1/36 315/247 |
| 7,882,382 B2 | 2/2011 | Aksamit et al. | |
| 7,951,007 B2 | 5/2011 | Wolinsky | |
| 7,953,455 B2 | 5/2011 | Moran et al. | |
| 8,149,224 B1 | 4/2012 | Kuo et al. | |
| 8,154,244 B1 | 4/2012 | Gorham et al. | |
| 8,180,395 B2 | 5/2012 | Moran et al. | |
| 8,249,656 B2 | 8/2012 | Sherman et al. | |
| 8,285,342 B2 | 10/2012 | Moran et al. | |
| 8,340,795 B2 | 12/2012 | Sherman | |
| 8,391,921 B2 | 3/2013 | Moran et al. | |
| 8,493,282 B2 | 7/2013 | Moran | |
| 8,509,848 B1 | 8/2013 | Cole | |
| 8,842,429 B2 | 9/2014 | Ahn et al. | |
| 8,868,075 B2 | 10/2014 | Sherman et al. | |
| 8,892,164 B2 | 11/2014 | Sherman | |
| 8,924,609 B2 | 12/2014 | Fowler | |
| 2003/0118006 A1 | 6/2003 | Yang et al. | |
| 2004/0212941 A1* | 10/2004 | Haas | G06F 1/3203 361/90 |
| 2005/0190124 A1 | 9/2005 | Manabe | |
| 2006/0099998 A1* | 5/2006 | Kang | H04B 1/1615 455/572 |
| 2006/0143352 A1 | 6/2006 | Park | |
| 2006/0273174 A1 | 12/2006 | Laitinen et al. | |
| 2007/0099593 A1* | 5/2007 | Thome | H04B 1/3877 455/349 |
| 2007/0145913 A1* | 6/2007 | Nobiki | H02M 1/36 315/291 |
| 2008/0028237 A1* | 1/2008 | Knight | H04L 12/66 713/300 |
| 2008/0168282 A1 | 7/2008 | Brundridge | |
| 2008/0197825 A1 | 8/2008 | Siri | |
| 2008/0224769 A1 | 9/2008 | Markowski et al. | |
| 2009/0124288 A1 | 5/2009 | Song et al. | |
| 2009/0128504 A1 | 5/2009 | Smith | |
| 2009/0167245 A1 | 7/2009 | Nguyen | |
| 2009/0218957 A1* | 9/2009 | Kraft | G06F 1/3265 315/291 |
| 2009/0280865 A1 | 11/2009 | Danis et al. | |
| 2010/0073202 A1 | 3/2010 | Mazed | |
| 2010/0220432 A1 | 9/2010 | Wise et al. | |
| 2010/0302028 A1 | 12/2010 | Desai et al. | |
| 2010/0323238 A1 | 12/2010 | Takahashi et al. | |
| 2011/0157815 A1 | 6/2011 | Lin | |
| 2011/0179405 A1 | 7/2011 | Dicks et al. | |
| 2011/0225307 A1* | 9/2011 | George | H04L 69/10 709/227 |
| 2011/0264944 A1 | 10/2011 | Newman | |
| 2012/0293934 A1 | 11/2012 | Boduch et al. | |
| 2013/0008707 A1 | 1/2013 | Kim | |
| 2013/0016040 A1 | 1/2013 | Ahn et al. | |
| 2013/0026572 A1 | 1/2013 | Kawa et al. | |
| 2013/0083149 A1* | 4/2013 | Hubner | H04N 21/2187 348/14.02 |
| 2013/0103212 A1* | 4/2013 | Andiappan | H04W 52/0225 700/286 |
| 2013/0155600 A1* | 6/2013 | Ross | H05K 7/1487 361/679.31 |
| 2013/0176869 A1* | 7/2013 | Finlow-Bates | H04W 52/0254 370/252 |
| 2013/0301689 A1* | 11/2013 | Marchand | H04B 1/38 375/219 |
| 2014/0009980 A1 | 1/2014 | Divan et al. | |
| 2014/0025224 A1 | 1/2014 | Wong et al. | |
| 2014/0028635 A1 | 1/2014 | Krah | |
| 2014/0267160 A1* | 9/2014 | Kim | G06F 3/0485 345/174 |
| 2015/0033167 A1 | 1/2015 | Helmes et al. | |
| 2015/0180847 A1* | 6/2015 | Nix | H04L 9/0869 713/168 |
| 2015/0358790 A1* | 12/2015 | Nasserbakht | G06F 17/30088 455/414.1 |

* cited by examiner

SYSTEMS FOR ENABLING MODULAR MOBILE ELECTRONIC DEVICES

CROSS-REFERENCE TO RELATED APPLICATIONS

This application claims the benefit of U.S. Provisional Application No. 61/976,173, filed on 7 Apr. 2014, which is incorporated in its entirety by this reference.

TECHNICAL FIELD

This invention relates generally to the mobile electronics field, and more specifically to new and useful systems for enabling modular mobile electronic devices in the mobile electronics field.

BACKGROUND

Current methods of mobile electronic device design create devices that are static, both in terms of functionality and in terms of design. Companies try to solve this problem by producing a wide range of devices having different functionalities and different designs. As a result, users of such devices are forced to make compromises; they lack the ability to customize the functionality and design of their mobile devices to truly meet their needs and preferences. Thus, there is a need in mobile electronics field to create systems for enabling modular mobile electronic devices. This invention provides such new and useful systems.

DESCRIPTION OF THE INVENTION EMBODIMENTS

The following description of the embodiments of the invention is not intended to limit the invention to these invention embodiments, but rather to enable any person skilled in the art to make and use this invention.

Figure 1:
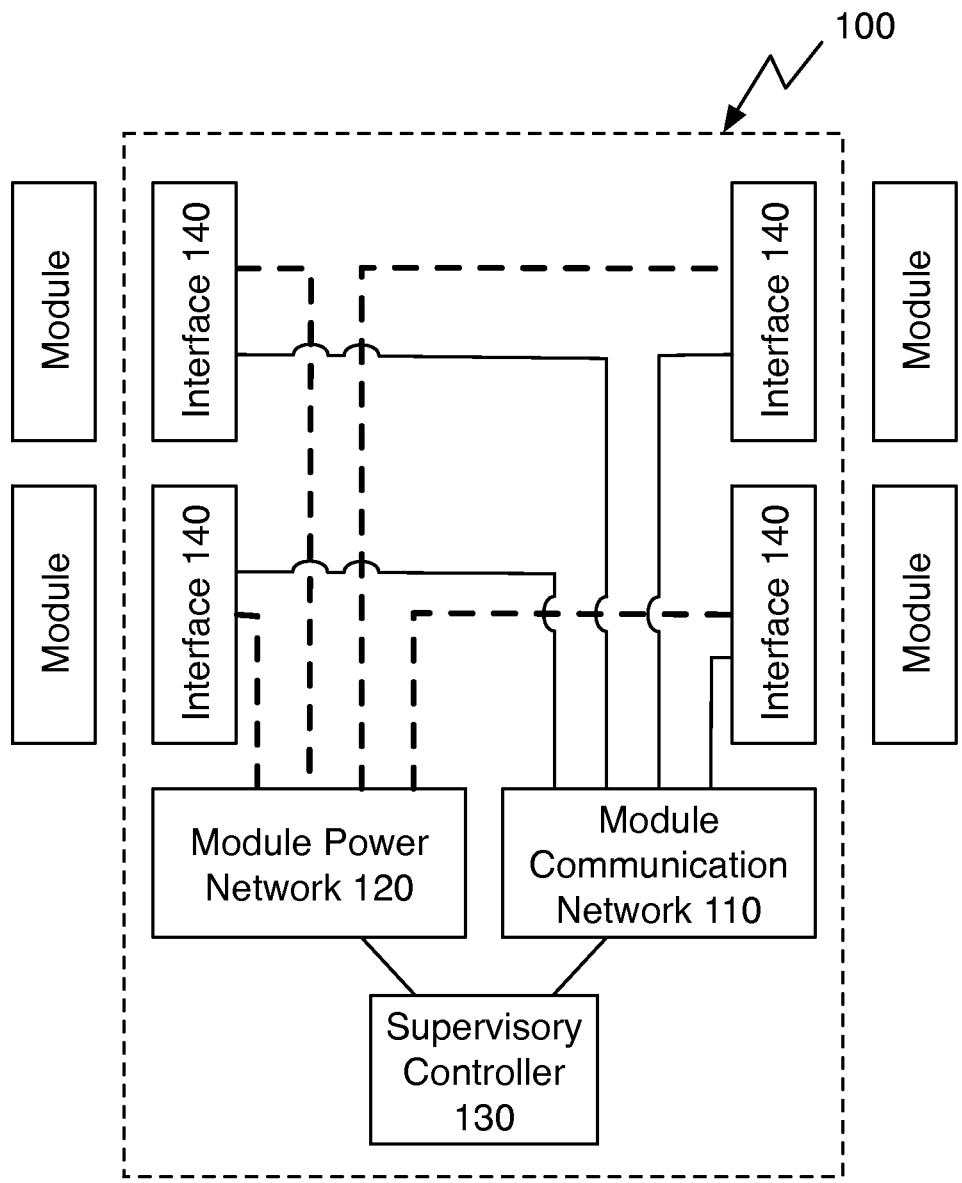
FIG. 1 is a diagram view of a system of an invention embodiment.

As shown in FIG. 1, a system 100 for enabling modular mobile electronic devices includes a module communication network 110, a module power network 120, a supervisory controller 130 and a plurality of module interfaces 140.

Figure 2A:
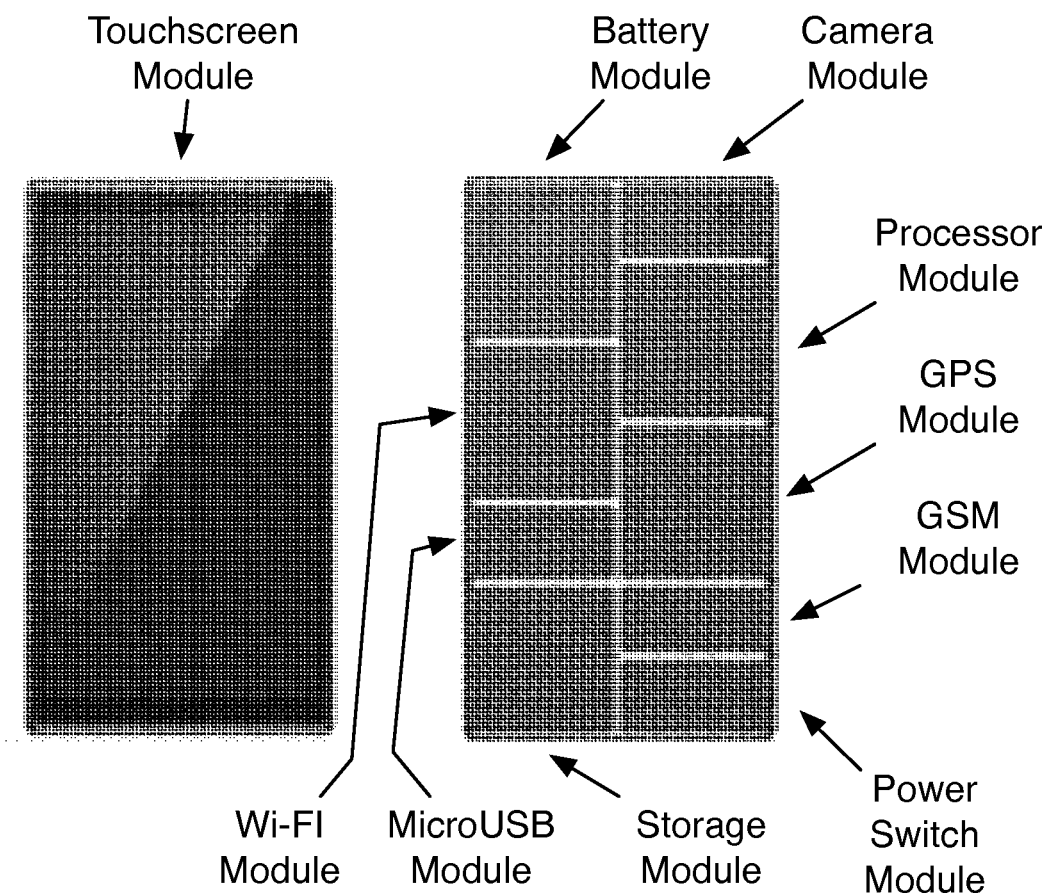
FIGS. 2A and 2B are image views of example mobile electronic devices based on a system of an invention embodiment.

The system 100 functions to enable the creation or modification of modular mobile electronic devices through the use of user-removable modules. Modules are preferably connected to the system 100 via the module interfaces 140; after connecting to the system 100 the modules preferably are able to communicate with each other using the module communication network 110 and to receive power from or send power to each other using the module power network 120. The supervisory controller 130 preferably manages both the module communication network no and the module power network 120. When multiple modules are connected to the system 100, the system 100 preferably enables the modules in confederation to serve as a mobile electronic device. The mobile electronic device created by such a confederation is preferably characterized by the confederated modules as well as the parameters of confederation, which are preferably determined by the system 100 and the confederated modules. As shown in FIG. 2A, a modular mobile electronic device configured to serve as a smartphone is an example of a possible mobile electronic device enabled by the system 100. Other examples of possible mobile electronic devices include those configured to serve as tablets, laptops, media players, cameras, measurement devices, gaming systems, vehicular computing devices, set-top boxes, and televisions.

Figure 2B:
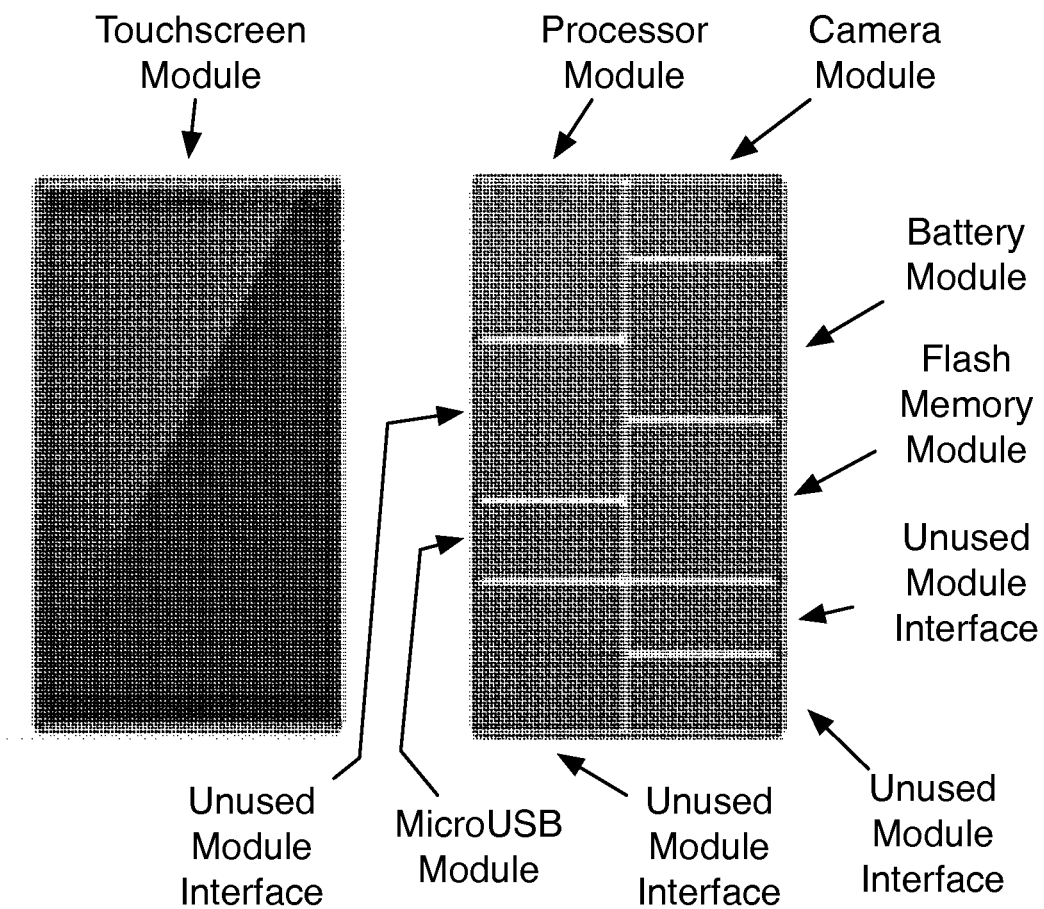

Modules connected by the system 100 are preferably user-removable and replaceable, enabling users to create mobile electronic devices with highly varied form, arrangement, and functionality. For example, as shown in FIG. 2B, a user may connect a camera module, a flash memory module, a processor module, a battery module, and a touchscreen LCD module to the system 100 to create a small and lightweight camera. The user could later add a cell-phone radio module and a microphone/speaker module to create a camera phone. Modules preferably follow an open standard, enabling third-party developers and entities to develop modules.

The flexibility afforded by module confederation preferably allows the system 100 to enable a number of favorable outcomes. Users can purchase only the modules necessary for their needs, allowing for reductions in cost. Users can also choose to replace modules or add additional modules at a later time. In combination, these two outcomes may help increase accessibility to mobile electronic devices (and in many cases, the internet) throughout the world, especially for people for whom a smartphone or a PC is not currently a good value proposition. For example, a user may buy the system 100 and a basic set of modules at a low price point, and transition to a more advanced phone by adding modules later on. These two outcomes may also help slow the creation of electronic waste by allowing mobile electronic devices to be upgraded or modified rather than replaced. Further, because the system 100 is compatible with modules of highly varied form and function, and because modules are preferably based on an open standard, module confederation may allow small or specialized companies to make modules playing to their strengths without designing a full mobile electronic device.

The system 100 is preferably compatible with a large range of module types. Modules may serve any function or purpose as long as they are capable of connecting to and communicating through the system 100. Some example module types include sensor modules, processor modules, storage modules, communication modules, display modules, and power modules. Examples of sensor modules include accelerometer modules, GPS modules, camera modules, depth imaging modules, fingerprint reader modules, biometric modules, microphone modules, digital/analog input modules, haptic input modules, infrared flash modules, pedometer modules, barometer modules, magnetometer modules, and gyroscope modules. Examples of processor modules include application processor modules and graphics processor modules. Examples of storage modules include flash memory modules and RAM modules. Examples of communication modules include Wi-Fi radio modules, GSM/CDMA radio modules, HDMI connector modules, NFC modules, Bluetooth radio modules, and USB connector modules. Examples of display modules include touchscreen LCD modules, non-touch graphical display modules, and e-ink display modules. Examples of power modules include battery modules, solar panel modules, and battery charging modules. The variety of modules preferably serve to provide various options and combinations of inputs, outputs, data storage, data processing, communication, power, and other suitable aspects of a computing device. Note that these example module types are in no way exhaustive or exclusive; i.e., modules may incorporate functionality from many of these example types or from none at all, and modules may additionally or alternatively incorporate suitable functionality not herein described.

Figure 3:
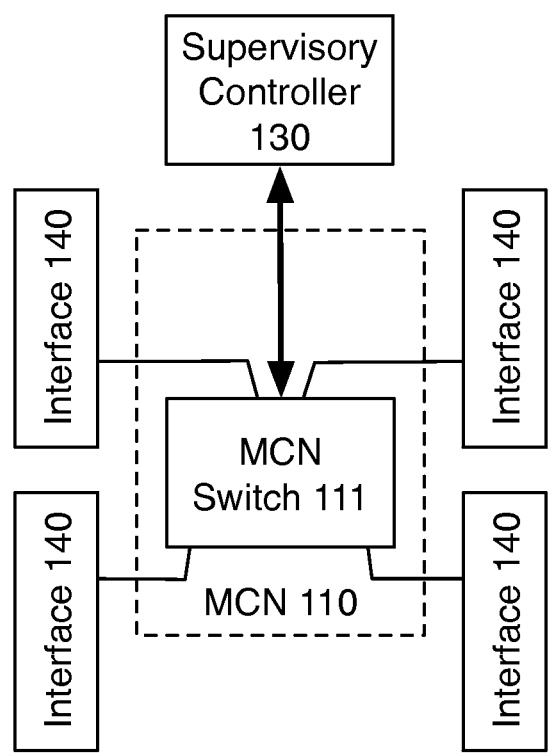
FIG. 3 is a diagram view of a module communication network of a system of an invention embodiment.

As shown in FIG. 3, the module communication network 110 (hereafter MCN 110) functions to allow for data communication between the modules connected to the system 100. Data transfer over the MCN 110 is preferably high speed (gigabits/second), low power (e.g., through low swing signaling and standby modes), low pin count, reliable, and robust. The MCN 110 preferably enables direct communication between any two modules connected to the system 100, but may additionally or alternatively enable indirect communication between modules connected to the system 100 (e.g., enabling one module to communicate with another module through an intermediary module). The MCN 110 preferably enables direct communication between modules by connecting each module interface 140 to an MCN switch in, but may additionally or alternatively enable direct communication between modules using any alternative connection architecture (e.g., connecting modules to a data bus).

The MCN switch 111 functions to enable direct communication between modules by creating data links between modules (which the MCN switch 111 preferably can modify, monitor, or control). By monitoring and/or controlling data links between modules, the MCN switch 111 preferably mediates module data transfer. The MCN switch in preferably operates using packet switching, but may additionally or alternatively operate in any suitable manner. The MCN switch 111 is preferably controlled by the supervisory controller 130 but may additionally or alternatively be controlled by a data manager of the MCN 110 or by any other suitable source. The supervisory controller 130 may control the MCN switch 111 by setting bandwidth limits, lane assignments, data rate limits, or any other suitable data transfer configuration data either globally or for individual modules. Other examples of data transfer configuration data include module priority levels; module priority levels determine how modules are assigned bandwidth over time. For example, if two modules send data transfer requests at the same time and the MCN 110 is capable of processing them only serially (as opposed to in parallel), the MCN 110 (either directly or through the supervisory controller 130) preferably allows the module with the higher module priority level to transfer data first. As another example, if two modules request 400 MBpbs of communication bandwidth, but the MCN 110 has only 600 MBps bandwidth available, the MCN 110 (or the supervisory controller 130) may grant the module with higher priority level the full 400 MBps requested, while granting the module with lower priority level only 200 MBps of communication bandwidth.

Direct communication preferably refers to data transfer that does not require a host or intermediary module for communication. For example, in the case of a an MCN 110 utilizing an MCN switch 111, modules are preferably able to communicate directly by sending packets to the MCN switch 111, which then are sent directly to other modules based on the destination address (set by the originating module). This is distinct from an architecture that requires a host; for example, peripheral devices connected to a USB bus require a master device to be able to pass information between each other. Another consequence of this is the maximum bandwidth available for inter-device communication is inherently limited by the bandwidth of connections to the master device and the processing capability of the mater device.

Figure 4:
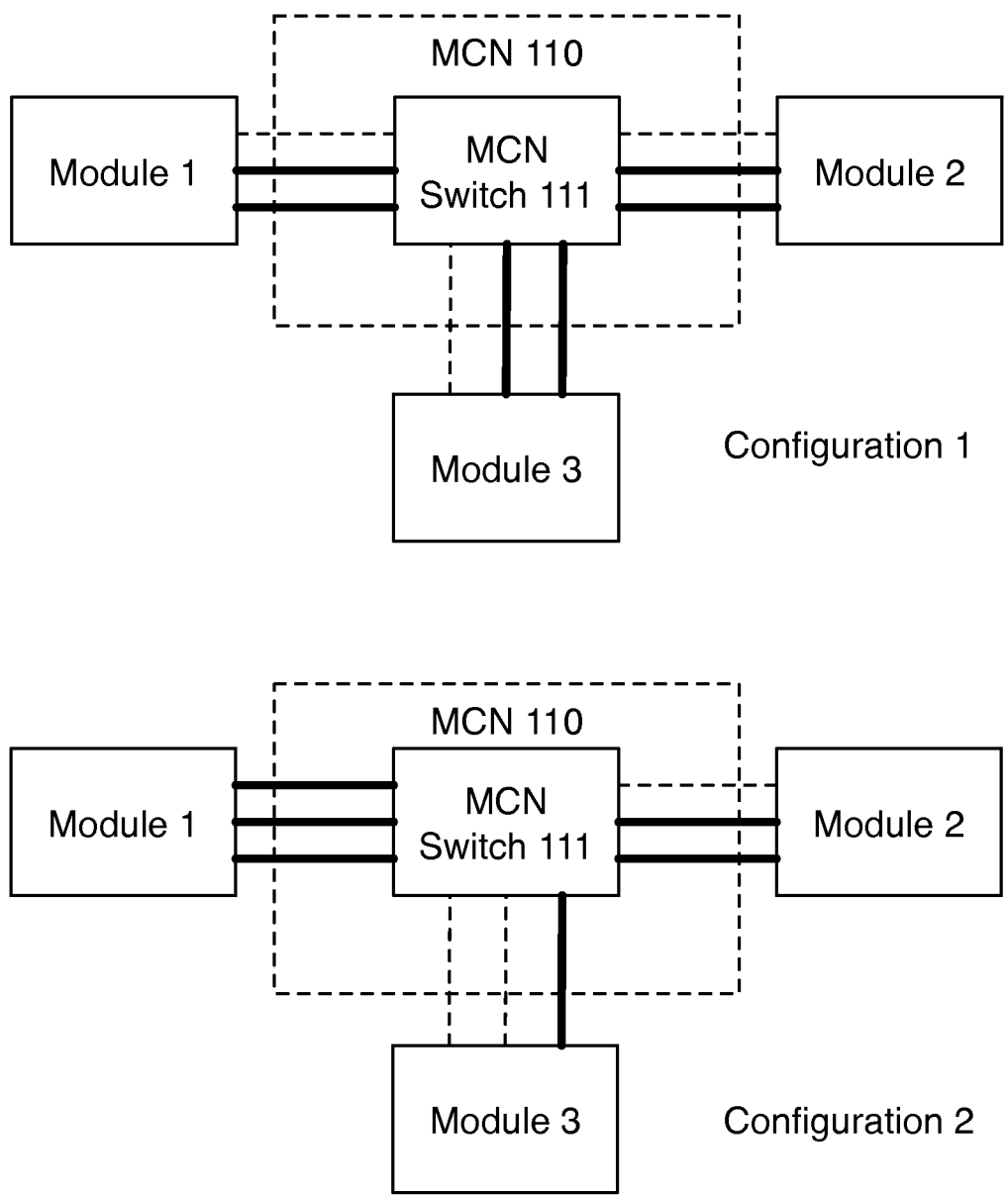
FIG. 4 is a diagram view of scalable bandwidth communication of a module communication network of a system of an invention embodiment.

Modules are preferably connected to the MCN 110 by multiple data lanes, where the data lanes connected to each module allow simultaneous data transfer between the module and the MCN 110. Each data lane corresponds to one or more data transfer links (and not necessarily any individual physical connection or set of connections). The bandwidth of data transfer between a module and the MCN 110 is preferably determined by the number of data lanes available and data rate of each lane. By changing the number of lanes in use by a module (and/or the MCN 110), the MCN no can control the rate of data transfer between the module and the MCN 110. Changing the number of lanes in use by a module is a way of dynamically scaling the maximum bandwidth available to a module. This dynamic bandwidth scaling is useful when (as is typical in many situations) the MCN 110 is limited in total data transfer bandwidth and this total bandwidth is less than the sum of the total bandwidths of all connected modules. For example, as shown in FIG. 4, three modules are connected to the MCN 110. Each module is connected to the MCN 110 by three data lanes, each having a bandwidth B (such that the maximum bandwidth available to each module is 3 B). The MCN switch 111 is capable of switching at most 6 B of data at a time. In a first configuration, the MCN switch 111 assigns 2 B of bandwidth to each module, but in a second configuration, the MCN switch 111 assigns 3 B, 2 B, and 1 B of bandwidth to modules 1, 2 and 3 respectively. Configuration 1 might be a configuration ideally suited for three modules with substantially similar data transfer requirements, while configuration 2 might be a configuration ideally suited for modules with differing transfer requirements. Note that while this example makes use of a switch, the concept of dynamically adjusting data lanes available to modules connected to the MCN 110 is also applicable to MCNs 110 utilizing different architectures (e.g. a data bus).

The MCN 110 preferably connects to the module interfaces 140 electrically via conductive wires, but may additionally or alternatively connect to the module interfaces 140 via any suitable connection method. In one example, the MCN 110 connects to the module interfaces 140 using optical connections. In this example, the MCN 110 might include light emitters and detectors for each module interface 140; the light might be passed through fiber optics, through an optical backplane, or through another type of waveguide or optical circuit component. The MCN 110 might additionally use an optical switch (either one that directly switches light or one that converts light to electricity to perform switching).

The MCN 110 preferably includes at least two data lines per module interface 140; a data transmit line and a data receive line, but may additionally or alternatively include any suitable number of data lines. If the MCN 110 includes a data receive line and a data transmit line for each module interface 140, this pair of data lines corresponds to one data lane. Additionally or alternatively, there may be any correspondence between data lines and data lanes (e.g. multiple data lanes per line or vice versa). In one example, the MCN 110 includes only one data line per module interface 140, on which data is both received and transmitted. In a second example, the MCN 110 includes four lines per module interface 140; a data receive line, a data transmit line, a clock receive line, and a clock transmit line. In general, the MCN 110 may include any number of data lines (but preferably at least one) and any number of other lines (e.g., clock lines, wake lines). The MCN 110 is preferably capable of full-duplex communication over its data lines, but may additionally or alternatively be limited to half-duplex communication. The MCN 110 preferably communicates with modules using scalable-low-voltage-signaling (SLVS) but may additionally or alternatively use low-voltage differential signaling (LVDS) or any other suitable signaling technology. The MCN 110 preferably supports hot-swapping modules, allowing them to be switched out without being powered-down; hot-swapping can preferably be performed without interfering with MCN 110 communication.

The MCN 110 preferably transmits data between modules using a single protocol and architecture for all modules and all module types. Using the same architecture and protocol for all modules enables all module interfaces 140 to potentially be identical. Alternatively, the MCN 110 may transmit data between module using multiple protocols and/or architectures. In some circumstances, module hardware may communicate internally in a protocol different than the native protocol of the MCN no. In these cases, the module preferably includes a module bridge allowing for communication over the native protocol of the MCN 110. Additionally or alternatively, the MCN 110 may include such bridges (allowing the module to communicate with the MCN 110 in its internal protocol, letting the MCN 110 handle conversion to the native protocol of the MCN 110).

The MCN 110 preferably uses a protocol that supports network features (allowing the use of the MCN switch 111) and a wide range of applications having a wide range of data traffic requirements, but may additionally or alternatively use any suitable protocol. The MCN 110 preferably also uses a protocol that can support a large number of connected modules.

In one example embodiment, the MCN 110 operates using the interface technology commonly known as MIPI® Uni-Pro$^{SM}$ and the physical layer specification commonly known as MIPI® M-PHY®.

Figure 5:
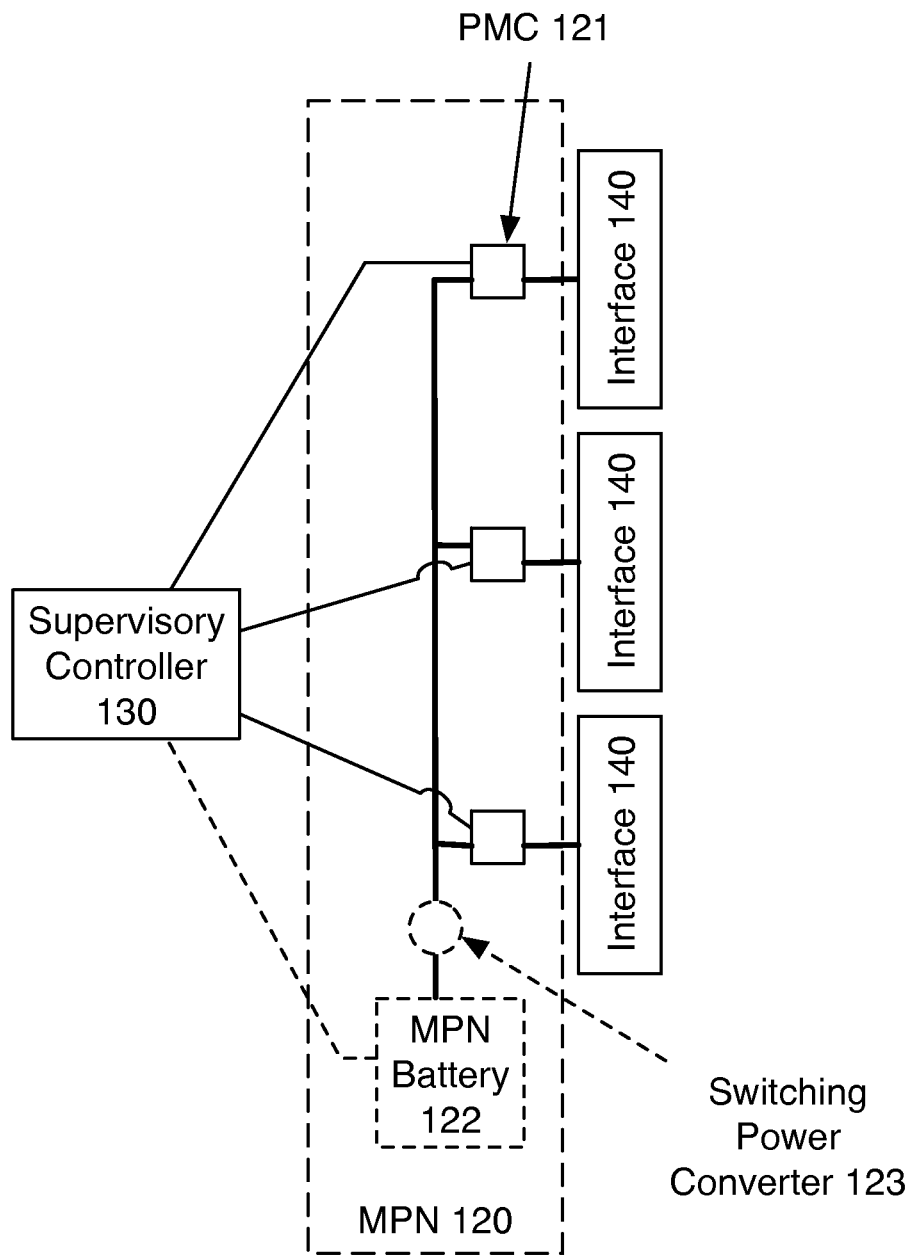
FIG. 5 is a diagram view of a module power network of a system of an invention embodiment.

As shown in FIG. 5, the module power network 120 (hereafter MPN 120) functions to distribute power to modules connected to the system 100. The MPN 120 preferably enables any module connected to the system 100 to send power to or receive power from any other module connected to the system. The MPN 120 preferably enables power transfer between modules by connecting each module interface 140 to a common power bus of the MPN 120, but may additionally or alternatively enable direct power transfer between modules using any alternative connection architecture (e.g., a switched power architecture). The MPN 120 preferably connects to the module interfaces 140 via conductive wires but may additionally or alternatively connect to the module interfaces 140 electrically via any suitable connection method.

The MPN 120 in particular preferably supports three types of modules (note that some modules may be more than one type): power consuming modules (e.g., camera, display), power producing modules (e.g., charger, solar panel), and power storing modules (e.g., batteries, capacitors). The MPN 120 preferably supports hot-swapping modules, including battery modules.

The MPN 120 preferably operates at a single unregulated DC voltage set in part by power sources connected to the MPN 120. More preferably, the MPN 120 is designed to operate at a bus voltage of 3.0V to 5.5V DC. In this scenario, the MPN 120 voltage is set by the highest voltage power source on the power bus. This allows batteries (which vary with voltage over usage/time) to be used directly without suffering double conversion losses. Additionally or alternatively, the MPN 120 may operate at a single regulated DC voltage, multiple (regulated or unregulated) DC voltages, AC voltages, or any combination thereof.

The MPN 120 preferably includes power monitor/control units 121 (hereafter PMC 121, also referred to as power management units) and more preferably includes one PMC 121 for each module interface 140. The PMCs 121 function to monitor and/or control power going to and coming from module interfaces 140. Having one PMC 121 for each module interface 140 allows module interfaces 140 to be switched on or off individually, for power consumption to be measured per-module, and for power state settings to be applied on a per-module basis. The PMCs 121 are preferably controlled by the supervisory controller 130 but may additionally or alternatively be controlled by a power manager of the MPN 120 or by any other suitable source. Each PMC 121 preferably includes an interface voltage monitor, an interface current monitor, an interface current limiter, and an interface switch. The interface voltage and current monitors preferably monitor the voltage at an interface and the current through an interface. The interface current limiter preferably prevents an interface from drawing too much current due to a short or a module malfunction, and the interface switch preferably controls whether an interface is connected to the MPN 120. The PMCs 121 may additionally or alternatively include any hardware that enables the MPN 120 to perform monitoring, control, and/or routing of power on the MPN 120.

For an MPN 120 utilizing a floating-voltage power bus, the PMCs 121 preferably enable the MPN 120 to change the voltage of the power bus by connecting or disconnecting power sources when multiple power sources are connected to the floating-voltage power bus. As an example, consider an MPN 120 connected to two battery modules; a first battery module having an output voltage of 4.5V and a second battery module having an output of 4V. If an output voltage of 4V is desired, the MPN 120 may, through use of PMCs 121, electrically couple the second battery to the MPN 120 while isolating the first module from the MPN. Note that in this case, the output voltage of the PMC 121 (i.e., the voltage at the power bus) is different from the output voltage of the first battery. If an output voltage of 4.5V is desired, the MPN may do the opposite; additionally or alternatively, the MPN 120 may connect both batteries to the MPN 120 to enable the 4.5V battery to power the MPN 120 and also charge the 4V battery. This may be enabled, for instance, by switching the PMC 121 to a battery charging mode (where the PMC 121 allows current to flow into, but not out of, the 4V battery).

Figure 6:
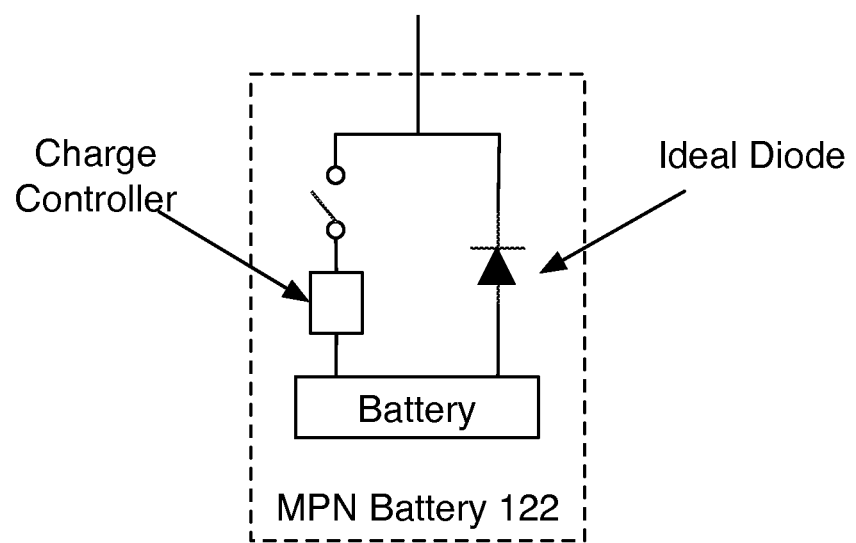
FIG. 6 is a diagram view of a module power network battery of a system of an invention embodiment.

The MPN 120 may additionally include an MPN battery 122. The MPN battery 122 functions to make sure that the power manager of the MPN 120 and the data manager of the MCN 110 (preferably the supervisory controller) have power even when no power source module is connected (enabling, for instance, the hot-swap of battery modules). The MPN battery 122 may additionally provide power to other modules (e.g. while a battery module is being hot-swapped for another). The MPN battery 122 may be any type of power storage device (e.g., Li-Ion battery, supercapacitor, compressed fluid storage). As shown in FIG. 6, the MPN battery 122 preferably includes a charging circuit that includes a charge controller, a charging switch, and an ideal diode controller. This charging circuit preferably prevents current from flowing into the battery of the MPN battery 122 when the battery is not being charged (via the ideal diode controller), and also manages the rate and method of charging when the battery is being charged (via the charge controller).

Modules connected to the system 100 (and the MPN 120) preferably are capable of operating on the power bus at any voltage supplied by the power bus inside operating range. If, for some reason, modules require certain regulated voltages (and do not include switching power converters), the MPN 120 may additionally include a switching power converter 123. The switching power converter 123 functions to regulate and convert the voltage of the power bus to other voltages; for example, converting the 3.0-5.5 VDC voltage of a power bus to regulated 3.3V and 1.2V lines.

In one variation of an invention embodiment, the MPN 120 is also used for communication. In this variation, data signals may be transmitted over MPN 120 (e.g., over the power bus), allowing for additional communication bandwidth on top of that supplied by the MCN 110. These data signals may be of a similar format to the data signals sent over the MCN 110 or may be of a different format. The data sent over the MPN 120 is preferably communication between modules and the supervisory controller 130 (e.g., the supervisory controller sending initialization instructions to a module) but may additionally or alternatively be data of any form or function.

The supervisory controller 130 functions to monitor and/or control data and power over the MCN 110 and the MPN 120. The supervisory controller 130 preferably includes a microprocessor or microcontroller, and storage (e.g., flash memory, EEPROM). The supervisory controller 130 is preferably directly connected to components of both the MCN 110 and MPN 120, but may additionally or alternatively monitor and/or control data and power in any suitable manner.

The supervisory controller 130 preferably includes a set of power states, which functions to enable the capability to operate in multiple power modes. The set of power state preferably includes at least a sleep state and an active state. In the sleep state, the supervisory controller preferably draws only a small amount of power, but can quickly be woken if necessary. The sleep state might be used when no modules are connected to the system 100 or when the modules do not need to transmit or received data or power from other modules connected to the system 100.

The supervisory controller 130 preferably manages the MCN 110 and the MPN 120, and thus controls how modules interact with the MCN 110 and MPN 120, including the addition and removal of modules.

The supervisory controller 130 preferably manages the MCN 110 by monitoring traffic through the MCN switch 111 and by controlling the MCN switch 111, but alternatively may manage the MCN 110 in any suitable manner. The supervisory controller 130 is thus preferably communicatively coupled to the MCN switch 111 in a management mode. The supervisory controller 130 preferably also communicates with modules through the MCN 110 to give modules instructions or information. Specifically, the supervisory controller 130 preferably sets the terms by which modules communicate with the MCN 110; this may include the amount of bandwidth assigned to a module, the level of access a module has to other modules via the MCN switch 111, and/or the priority of a module's communication through the MCN 110. These terms may be part of a MCN configuration state. The supervisory controller 130 preferably implements some of the terms of communication by communicating with the module (for example, setting with the module an established rate of communication) and some of the terms of communication by communicating with the MCN switch 111 (for example, module communication priority), but may additionally or alternatively implement communication terms in any suitable manner.

The supervisory controller 130 preferably manages the MPN 120 in three primary ways: through the PMCs 121, through the MPN battery 122 (if present), and through communication with modules over the MCN 110; but may additionally or alternatively manage the MPN 120 in any suitable manner. For example, if the MPN 120 includes a switching power converter 123, the supervisory controller 130 may also manage the MPN via control of the switching power converter 123.

The supervisory controller 130 preferably manages the MPN 120 through the PMCs 121 by monitoring and/or controlling the power flowing through each PMC 121. Monitoring current and voltage at the PMC 121 preferably allows the supervisory controller 130 to ensure that modules operate within specified parameters (for instance, not drawing too much current or providing an overly high voltage to the MPN 120). Controlling the power through the PMC 121 preferably includes limiting current that can flow through the PMC 121 (in either direction). Current limiting may help prevent a module interface 140 short from drawing too much power, for instance. Controlling the power through the PMC 121 may additionally or alternatively include switching the PMC 121 such that current can no longer travel through it; if the PMC 121 is directly in front of a module interface 140, switching the PMC 121 may serve to disconnect the module interface 140 from the MPN 120.

The supervisory controller 130 preferably manages the MPN 120 through the MPN battery 122 by communicating with the battery and/or directly controlling MPN battery 122 circuitry. Particularly, the supervisory controller 130 preferably controls whether the MPN battery 122 is in a charging mode (e.g., it can draw power from the MPN 120), a supply mode (e.g., it can supply power to the MPN 120), or a disconnect mode (e.g., it is isolated from the MPN 120). The supervisory controller 130 may control this by sending control signals to the MPN battery 122 or by directly altering the state of circuitry connected to the MPN battery 122.

The supervisory controller 130 preferably manages the MPN 120 through communication with modules over the MCN 110 by providing instructions to modules on how they should interface with the MPN 120. This may include instructing modules that they may only use a certain amount of power, or, in the case of modules capable of supplying power to the MPN 120 (e.g., battery modules), whether those modules should be receiving or supplying power to the MPN 120. This also may include any other suitable instructions to modules regarding power usage. These instructions may be part of a module power state set or managed by the supervisory controller 130. If modules do not follow the instructions of the supervisory controller 130, the supervisory controller 130 may disconnect or otherwise limit the access of the modules to the MPN 120.

In the variation of the invention embodiment where the MPN 120 is used for communication, the supervisory controller 130 preferably controls communication over the MPN 120 through a combination of the aforementioned techniques, but may additionally or alternatively control communication over the MPN 120 in any suitable manner.

The supervisory controller 130 preferably stores data relating to the operation of the MCN 110 and the MPN 120 in its memory. This data preferably instructs the supervisory controller 130 how to manage the MCN 110 and MPN 120 based on the state of the system 100. For example, the data stored in the supervisory controller 130 may instruct the supervisory controller 130 to disconnect any module that draws over 500 mA of current. As another example, this data may instruct the supervisory controller 130 how to enumerate modules when they are added to the system 100. The data stored on the supervisory controller 130 may additionally or alternatively include module information data, power state data, and any other suitable data. Module information data preferably includes information about how modules should be handled based on an identification number or other characteristic. For example, module information data might include a list of module identification numbers that correspond to display modules. Along with a rule that display modules should be given priority on the MCN 110, this allows the supervisory controller 130 to help guarantee quality of service over the system 100. Power state data preferably includes data on power states that can be implemented in modules (or in the system 100). For example, this might include storing information on what commands should be sent to modules to enable power-saving modes. The supervisory controller 130 may additionally or alternatively contain information supplied by modules; for instance, upon system boot or module initialization, the supervisory controller 130 may ask modules for certain information about the modules. This information may then be stored (and potentially accessible to other modules). Access to this information preferably enables modules to be aware of the state of the system 100 and/or modify their state based on the state of the system 100 (or based on the states of connected modules).

The supervisory controller 130 preferably enables modules to be connected to or disconnected from the system 100 at any time. The supervisory controller 130 preferably initiates a module initialization process when modules are first connected to the system 100; the module initialization process preferably initializes communication between the system 100 and the modules. The module initialization process preferably includes detecting (at the supervisory controller 130) the presence of a newly connected module. The presence of the module may be detected in any suitable manner, and may include waking the supervisory controller 130 if the supervisory controller 130 is in a sleep state. Some examples of module presence detection include detecting the module via sensors connected to the supervisory controller 130 (e.g., a circuit that detects when a physical pin of the module interface 140 is depressed, signifying a connected module), detecting the module via the MCN 110 (e.g., the module sends wake signals over the data lines of the MCN 110 to the MCN switch 111 or any other suitable location, or the connection of the module otherwise changes the signal detected by the MCN switch 111), or detecting the module via the MPN 120 (e.g., the connection of the module to the MPN 120 causes a measured dip in power, or the module sends a signal over the MPN power lines).

Once the supervisory controller 130 has detected the module, the supervisory controller 130 preferably establishes a connection between the module and the supervisory controller 130 through the MCN 110 (preferably via the MCN switch 111) and provides instructions for the module to interface with the MCN 110 and the MPN 120. The module initialization process may additionally or alternatively include connecting the module to the MPN 120 or modifying a default connection to the MPN 120 (as described in the following example).

In one example, a module is connected to the system 100 when the system 100 is in a sleep state. In this sleep state, the MCN switch 111 is turned off, and the supervisory controller 130 is in a sleep state. The MPN 120 is configured to supply a small amount of power to each module interface 140. When the module is connected, it receives current-limited supply of power via the MPN 120, allowing the module to at least partially power on. The module then sends a wake signal to the supervisory controller 130 over a wake line (connecting the module directly to the supervisory controller 130), waking the supervisory controller 130. The supervisory controller 130 then turns on the MCN switch 111 and also instructs the MPN 120 to supply full power to the module. After turning on the MCN switch 111, the supervisory controller 130 preferably establishes a communication link between the MCN 110 and the module, and completes the module initialization process.

In addition to managing modules as related to the MCN 110 and the MPN 120, the supervisory controller 130 may also manage modules in any other suitable way. For instance, the supervisory controller may connect to thermal sensors integrated into the module interfaces 140, and in this way, detect thermal properties of modules connected to the system 100. The supervisory controller 130 may be able to instruct a module to reduce power consumption if the module begins to overheat, for instance, and if the module does not respond, the supervisory controller may cut off power via the MPN 120 to the module to protect the module and/or the system 100 from damage. The supervisory controller may also perform functions such as instructing one module to go to a sleep mode based on signals from other modules; for example, putting a display module to sleep after detecting a period of inactivity from a motion-detecting module.

In a variation of an invention embodiment, the supervisory controller 130 may itself be managed or controlled by a module connected to the system 100. For instance, if an application processor module is connected the system 100, that application processor may be able to modify the operation of the supervisory controller 130, including modifying the contents of the supervisory controller 130 storage and/or usurping some functionality from the supervisory controller 130.

In another variation of the invention embodiment, the supervisory controller 130 may receive programming that enables the supervisory controller 130 to perform additional functions (e.g., module function data). For example, the supervisory controller 130 may receive programming from a module (e.g., an application processor) that enables it to perform some functions of that module. The received programming could be used to allow the supervisory controller 130 to perform certain functions of a module in the absence of that module. This received programming, either as sent to the supervisory controller 130, or after processing by the supervisory controller 130, preferably forms a module emulation profile (instructions dictating how the supervisory controller 130 should emulate some of a module's functionality) As an example, a sound recording device is created by the connection of a microphone module, a button module, a storage module, a touchscreen module, an application processor module, and a battery module to the system 100. The sound recording device functions according to parameters input by the user via the touchscreen module and applied by the application processor module. In one mode of operation, a button press records sound after a set delay for a set period of time. In this example, the user could direct the application processor module to program the supervisory controller 130 to perform this same functionality for a given delay and period. After the supervisory controller 130 has been programmed, the user removes the application processor module and the touchscreen module. Because of the programming in the supervisory controller 130, the button press still records sound as set in the programming, enabling the supervisory controller 130 to perform some of the functionality previously handled by the application processor.

Figure 7:
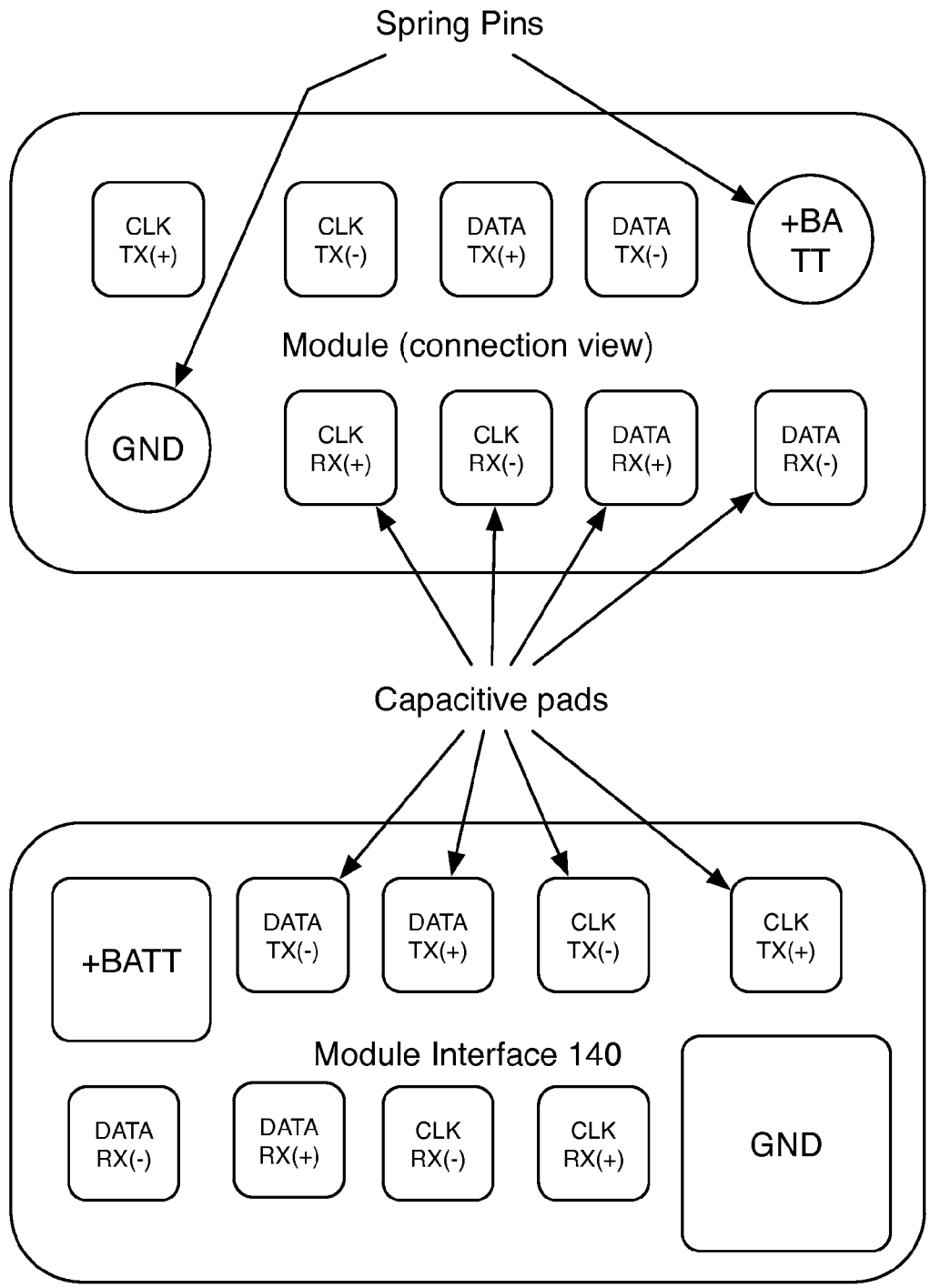
FIG. 7 is a diagram view of a module interface of a system of an invention embodiment.

The module interfaces 140 function to enable the connection of modules to the system 100. The module interfaces 140 preferably allow for modules to connect to both the MCN 110 and the MPN 120; the module interfaces 140 are preferably connected to the MCN 110 and MPN 120 with conductive wires, but may additionally or alternatively be connected to the MCN 110 and MPN 120 in any suitable manner as previously described. The module interfaces 140 may connect modules to the MCN 110 and MPN 120 in any suitable manner (e.g., electrically, optically); the manner of connection to the MCN 110 and the manner of connection to the MPN 120 for a given module may be of the same types or of different types. For example, modules may connect to the module interface 140 using contact methods (e.g., conductive contact via plug and socket) and/or non-contact methods (e.g., optical, capacitive, and RF data/power transfer methods). As shown in FIG. 7, a module may (through the module interface 140 connect to the MCN 110 using non-contact capacitive data transfer methods and to the MPN 120 using conductive contact via a spring pin to conductive pad interface.

The module interfaces 140 are preferably identical, allowing any compatible modules to connect to any module interface 140 of the system 100, but may alternatively be non-identical (e.g., separate interface types for different module types).

As a person skilled in the art will recognize from the previous detailed description and from the figures and claims, modifications and changes can be made to the embodiments of the invention without departing from the scope of this invention defined in the following claims.

We claim:

1. A system for enabling a modular mobile electronic device comprising:
   a module communication network enabling data transfer between modules of the modular mobile electronic device;
   a module power network enabling power transfer between modules of the modular mobile electronic device, wherein the module power network comprises a power bus;
   a set of module interfaces removably coupling modules of the modular mobile electronic device to the modular mobile electronic device; and
   a supervisory controller communicatively coupled to the module communication network and electrically coupled to the module power network;
   wherein the set of module interfaces electrically connects modules in parallel to the power bus, the set of module interfaces is connected to the power bus by a set of power management units, and power transfer through the set of module interfaces is controlled by the set of power management units;
   wherein the set of power management units are controlled by the supervisory controller;
   wherein the set of power management units control power transfer on the power bus according power states set by the supervisory controller;
   wherein a first power state for a first module connected to the modular mobile electronic device includes a maximum power transfer level; and
   wherein a first power management unit connected to the first module electrically isolates the first module from the module power bus upon detecting a power transfer level greater than the maximum power transfer level.

2. The system of claim 1, wherein data transfer between a first module and a second module on the module communication network is initiated by the first module and completed without using a host or an intermediate module.

* * * * *